United States Patent [19]

Lloyd

[11] 4,239,346
[45] Dec. 16, 1980

[54] COMPACT LIQUID CRYSTAL DISPLAY SYSTEM

[75] Inventor: Randahl B. Lloyd, San Marcos, Calif.

[73] Assignee: Hughes Aircraft Company, Culver City, Calif.

[21] Appl. No.: 41,572

[22] Filed: May 23, 1979

[51] Int. Cl.³ .............................................. G02F 1/133
[52] U.S. Cl. .................... 350/334; 350/333; 340/719; 340/784; 357/41
[58] Field of Search .................. 350/332, 333, 334; 340/719, 784; 357/41

[56] References Cited

U.S. PATENT DOCUMENTS

| 3,862,360 | 1/1975 | Dill et al. | 350/334 X |
| 4,103,297 | 7/1978 | Greivy et al. | 350/334 X |

*Primary Examiner*—Edward S. Bauer
*Attorney, Agent, or Firm*—Elliot N. Kramsky; W. H. MacAllister

[57] ABSTRACT

A compact liquid crystal display of the type wherein a pixel array formed of liquid crystal material is addressed by an associated array of MOSFET circuits, each circuit including a switching device and an overlying storage capacitor. A plurality of substantially parallel gate buses located orthogonal to and insulated from a plurality of parallel drain diffusions are provided for the application of control and video data to the array. A layer of metallization, located within the backplate, forms a common ground plate for the capacitors of the array, shielding the drain diffusions from incident light and thereby eliminating the need for space-consuming diffusion-to-conductor contact regions.

6 Claims, 14 Drawing Figures

Fig. 7a.
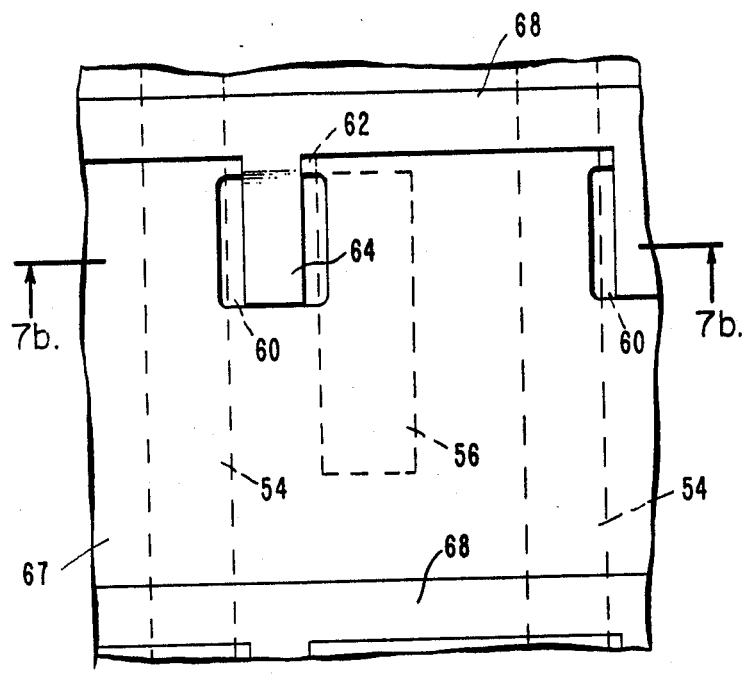
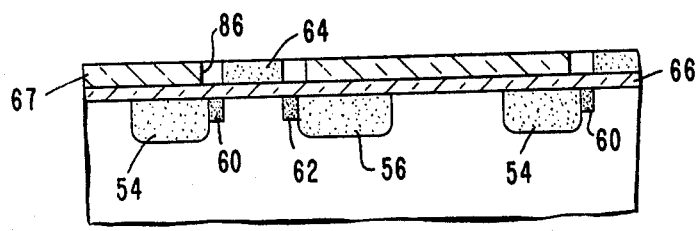
Fig. 7b.

COMPACT LIQUID CRYSTAL DISPLAY SYSTEM

The invention herein was reduced to practice in the course of or under Contract No. DAAK70-77-C-0225 with The United States Army.

BACKGROUND OF THE INVENTION

1. Field of the Invention

This invention relates to liquid crystal display systems and particularly to systems comprising an array of individually addressable electrodes formed on a semiconductor backplate.

2. Description of the Prior Art

One type of liquid crystal display system comprises a plurality of individually addressable cells arranged in a matrix, with each of the elemental cells of the array operating as a reflective light valve. In the absence of an applied potential, the liquid crystal material is clear and the cell appears dark to an observer. When an electric potential above a threshold level is applied across the liquid crystal material, it scatters the light, much like a piece of frosted glass, and the cell appears white to the observer. The percentage of incident light which is scattered toward the viewing area is proportional to the magnitude of the potential applied to the liquid crystal cell, and, consequently, gray level display presentations may be generated.

In high resolution display systems, a composite presentation is built up from thousands of individually controllable elemental liquid crystal cells, each of which must be updated (the potential across the cell reprogrammed) at a rate sufficiently high to prevent observable flicker in the presentation. This may be accomplished by sandwiching a thin layer of liquid crystal material between a glass plate having a transparent electrode and a backplate having a matrix array of reflective electrodes formed on a semiconductor wafer. The backplate also contains the individual addressing circuitry (field-effect transistor) and electrical storage circuitry (capacitor) disposed contiguous to the reflective liquid crystal contact electrode for each cell, with the reflective electrode forming one element or plate of the capacitor. Each field effect transistor is utilized to address an associated element of the matrix array, and the associated storage capacitor maintains the applied potential across the liquid crystal cell until the information is updated or "refreshed". (Current television industry standards required the update of information every 33 milliseconds.)

A liquid crystal display of the type described hereinabove is disclosed, for example, in U.S. Pat. No. 3,862,360 issued to Dill et al which is assigned to the assignee of the present invention. McGreivy et al in U.S. Pat. No. 4,103,297, also assigned to the assignee of the present invention, presents an improvement upon the device disclosed by Dill in that the individual circuits of the display, formed into an array on the semiconductor backplate, are protected from the known deleterious effect of (even low levels of) illumination upon certain exposed portions such as between the adjacent reflective (metallic) electrodes. McGreivy et al obtain protection from hole-electron generation effects relating to the space charge regions beneath the reflective electrodes and depletion regions adjacent MOSFET sources by combining highly doped, ion-implanted regions immediately under the backplate insulator layer with a reflective electrode geometry which prevents the creation of space charge regions and, hence, harmful inversion layers.

Other regions in which device illumination effects degrade performance and design are associated with the buses which supply video and control data to the individual cell circuits. These orthogonal bus sets, each of which comprises a plurality of parallel conductors, interlie the reflective electrodes, their intersections defining the individual cell areas and borders. The individual reflective electrodes, conductive elements, must maintain a separation distance therebetween to avoid electrical shorting. This leaves the underlying buses exposed to illumination which hitherto has necessitated the fabrication of both sets of buses of material unaffected by illumination, such as polycrystalline silicon (polysilicon) doped for conductivity. A design problem is encountered by a matrix formed of such buses at each intersection thereof caused by the need to maintain electrical insulation between the buses. The solution commonly employed has been to fabricate conductive "underpass" regions at such intersections consisting of highly doped conductive segments of one bus underlying and insulated from the other bus. These regions underlie and extend somewhat beyond the regions of intersection. An insulating layer of oxide separates this doped region from the layer of polysilicon of which both bus sets are formed. Holes are etched in the overlying oxide so that electrical contact is obtained between this highly doped region and one of the two intersecting buses. The "overpassing" polysilicon bus protects the highly doped region from the noise and other undesirable effects otherwise caused by hole-electron generation and ionization within the diffusion which would result from the exposure of the doped region to illumination.

A constraint upon cell size, and, consequently, the video resolution and compactness obtainable by means of the above-described prior art matrix is associated with the existence of the above-described "underpass" regions. Since the two sets of intersecting buses are conductive and formed substantially of one polycrystalline layer, tolerances must be observed to avoid shorting therebetween near the region of intersection (i.e., the discontinuity in the polysilicon portion of the underpassing bus). Such tolerances necessarily leave a small portion of the underlying doped region exposed to illumination and unavoidably result in the introduction of a quantum of illumination noise. Additionally, maintenance of the mechanical integrity of the device in light of presently available fabrication techniques dictates a minimal spacing between any two holes in the oxide layer. The latter consideration is complicated by the fact that an additional oxide hole per cell must be provided for the electrical coupling of the reflective electrode to the remainder of the underlying circuit. In sum, considerations of the above nature, plus the common practice of forming one capacitor plate of a highly doped region of the substrate so that FET and capacitor are side-by-side, have limited the resolution obtainable in present day liquid display panels to a picture cell (or pixel) area of approximately 10×10 mils. Inherent in this above-described limitation upon the compactness of cell area, and hence panel size obtainable, is the concomitant inability to mass produce useable panels of such size with efficient and economical present day methods of manufacture, as yield per chip is severely limited.

SUMMARY AND OBJECTS OF THE INVENTION

It is therefore an object of the present invention to achieve a liquid crystal display having resolution hitherto unobtainable in the art.

Another object of the present invention is to achieve the above object by means amenable to high yield per chip fabrication by present day MOS processes.

Yet another object of the present invention is to achieve a liquid crystal display matrix having an increased capacitance per cell whereby adequate dc current can be provided to the liquid crystal material for an entire television frame without requiring refreshing of the stored analog voltage potential on the capacitor.

Still another object of the present invention is to achieve a high resolution liquid crystal display having a backplate substrate which is unaffected by incident illumination.

Yet another object of the present invention is to achieve a compact liquid crystal display cell.

Liquid crystal display systems in accordance with the subject invention feature liquid crystal material sandwiched between a semiconductor backplate and a glass plate having a transparent electrode formed thereon. Formed upon the backplate is an array of FET switches, each of which is electrically engaged to an overlying reflective electrode. Each FET forms the switching portion of a circuit cell, the bounds of which are defined by the intersection of a plurality of substantially parallel, equally spaced gate buses with an orthogonally oriented plurality of substantially parallel drain bus diffusions. The gate bus electrodes are throughout isolated from the substrate containing the drain bus diffusions so that the points of intersection therebetween provide no danger of mutual shorting.

A further significant feature of the present invention is the provision of a "stacked" cell, wherein all elements of the MOS capacitor overlie the associated FET. This is in contrast to the prior art geometry wherein the FET and capacitor of a cell are positioned side-by-side (a result of the common practice of forming one capacitor plate as a diffusion within the substrate). The stack is achieved by means of a unitary metal light blocking layer which interlies the reflective electrodes and FETs. The light blocking layer, in addition to providing a common ground plate, protects the underlying drain diffusions from illumination.

BRIEF DESCRIPTION OF THE DRAWINGS

The novel features of this invention, as well as the invention itself, will best be understood from the accompanying description taken in connection with the accompanying drawings wherein like characters refer to like parts and in which:

FIGS. 7a and 7b are plan and cross-sectional views of the device after the deposition of polysilicon to form the gate electrode buses;

DESCRIPTION OF THE PREFERRED EMBODIMENT

Figure 1:
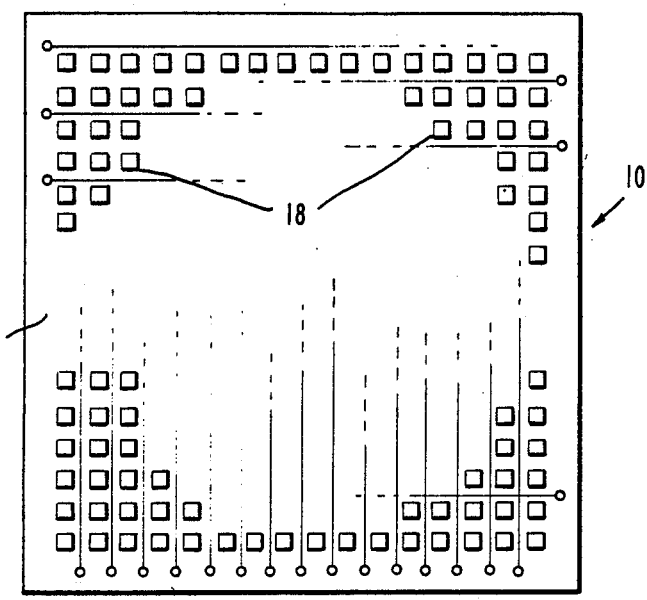
FIG. 1 is a plan view of the front surface of the backplate of a display panel of the type to which the present invention pertains.

Before describing the improvements effected by the present invention, the structure and operation of a display comprising an array of elemental cells each corresponding to one video pixel will be disclosed with reference to the above-identified Dill et al U.S. Pat. No. 3,862,360, which is representative of the relevant prior art and incorporated herein by reference. Various aspects of the device are described infra with reference to FIGS. 1 through 4. As there shown, a liquid crystal display panel 10 is formed by sandwiching a thin layer of liquid crystal material 12 between a glass plate 14 which has a transparent electrode 15 covering one surface and a backplate 16, the latter comprising a semiconducting substrate, typically silicon, having a matrix array of reflective electrodes 18 formed thereon. The individual addressing circuits are adjacent reflective electrodes which also serve as the top plates of the storage capacitors of an integrated R-C circuit. The transparent electrode 15 acts as a common electrode for all of the individual cells which are arranged in a plurality of rows and columns. This 16×16 matrix of elemental cells, each corresponding to one video pixel, illustrated in FIG. 1, is shown at approximately 20 times actual size for clarity of illustration. In an actual panel, many more elements, on the order of 1,000×1,000 or more would be used. Associated with each cell in addition to the liquid crystal material 12 sandwiched between the electrodes 15 and 18 is a field-effect transistor (FET) 20 and a capacitor 22.

Figure 2:
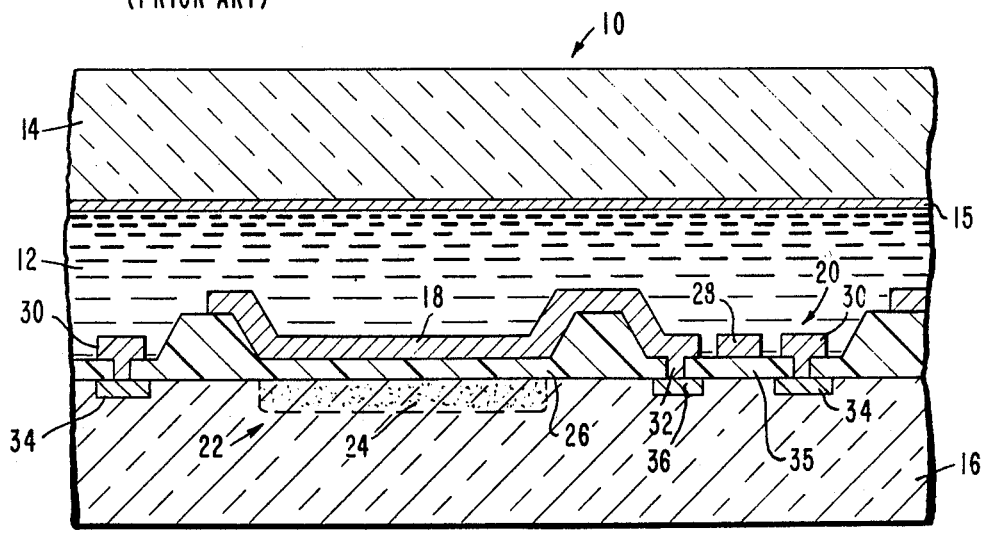
FIG. 2 is a cross section through a liquid crystal display panel as disclosed in the Dill et al patent which is representative of the prior art.

The capacitor 22 and the FET 20 are located side-by-side and form an elemental sample and hold circuit to "stretch" addressing pulses, typically 30 microseconds in duration, to the pulses of typically 30 milliseconds duration needed to effectively maintain the potential across the liquid crystal material between the addressing pulses. The capacitor 22 comprises the metal electrode 18 separated from a N+ doped region 24 (normally grounded and preferably ion-implanted) in the silicon substrate 16 by a dielectric layer 26. Associated with and forming the P channel FET shown in FIG. 2 are gate 28, (a tab formed with a gate electrode bus, discussed infra) and drain and source regions 34 and 36. The latter are formed as P+ regions in the N-type silicon substrate 16. Through the source contact 32, which is an integral extension thereof, the reflective electrode 18 is in contact with the source region 36. All gates in a given row of cells are composed of tablike extensions of a gate electrode bus 38 and the drain regions of all FETs in a given column of cells are segments of a drain electrode bus 30.

Figure 3:
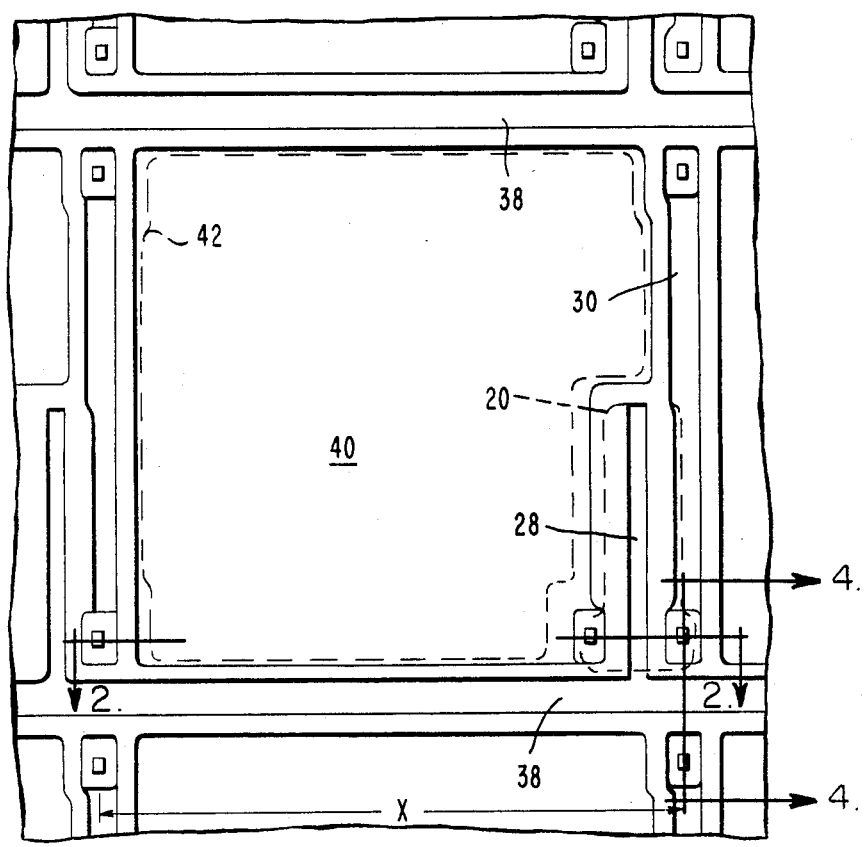
FIG. 3 is a substantially enlarged top view of the semiconductor backplate of a prior art liquid crystal display as disclosed in the Dill et al patent.

In FIG. 3 there is shown, in greatly enlarged scale, a top view of a single elemental cell 40 (corresponding to an individual video pixel) of the liquid crystal display panel 10. The boundary of the capacitor which is formed beneath the reflective electrode 18, is depicted by a closed curve 42. It is noted that the cell is shown in FIG. 3 at a greatly magnified scale, such as 400 times actual size. To provide an indication of the actual scale of liquid crystal display cells, in accordance with the prior art, the distance X between the adjacent drain buses of FIG. 3 might be 10 mils, for example.

Figure 4:
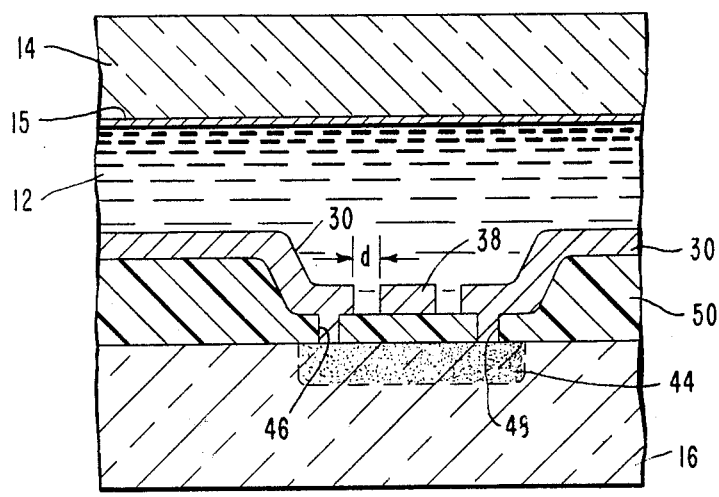
FIG. 4 is a cross section of a portion of the liquid crystal display panel as disclosed in the Dill et al patent taken along the line 4—4 of FIG. 3 principally to illustrate the manner of intersection of the drain and gate electrode buses in the prior art over which the present invention represents a substantial improvement.

It will be noted that, throughout substantially its entire length, each drain electrode bus 30 comprises a longitudinal strip of polycrystalline silicon. The strip is, however, temporarily discontinued at the intersection with a gate electrode bus 38 positioned orthogonal thereto. FIG. 4, a sectional view taken along the line 4—4 of FIG. 3, illustrates the manner in which intersecting conductive electrodes are electrically insulated. As there shown, a P+ doped region 44 is provided in the substrate 16. The region 44 allows a continuous conductive path for the associated drain electrode bus 30 in the regions of intersection with a gate electrode bus 28. Additionally, the back bias PN junction between the substrate 16 and the region 44 provides insulation between the underpassing portion of drain electrode and the silicon substrate to prevent dissipation of signal charge within the substrate 16.

Contact holes 46, 48 are prepared in the insulative oxide layer 50 by standard photolithographic etching techniques. It has been found that the size of an individual cell 40 and, accordingly, the resolution obtainable by a liquid crystal display panel 10, is limited by the contact holes 46, 48 necessitated by the "underpass" arrangement of FIGS. 3 and 4. Localized structural weakening in the oxide layer 50 results from the very existence and fabrication of the holes, placing a limit upon the closeness of spacing therebetween. Such spacing must also be maintained between the holes 46, 48 and the source contact 32 seen in FIG. 2. The introduction of such spacing constraints into the matrix panel geometry serves to limit the cell size and resultant resolution obtainable (and limits the available methods of manufacture) in prior art liquid crystal displays. Also, as the conductive polysilicon of both sets of buses is formed from a single layer, a critical spacing must additionally be maintained between the abutting edges of the drain electrode bus segments and the gate electrode bus at the drain discontinuity (seen in FIG. 4 as the distance d) to avoid electrical shorting.

The above-referenced prior art design restrictions which place a limit upon the display cell size and, hence, upon video resolution obtainable are overcome by means of an improved liquid crystal display panel featuring a dense array of compact liquid crystal display cells. The nature of the improved display will become apparent from the following discussion of an individual elemental cell and its method of fabrication. A plurality of such compact cells will in general correspond in gross to the panel arrangement of FIG. 1 although, of course, allowing a more compact panel 10 having many times the number of elemental cells and associated reflective electrodes than of the prior art.

Figure 8A:
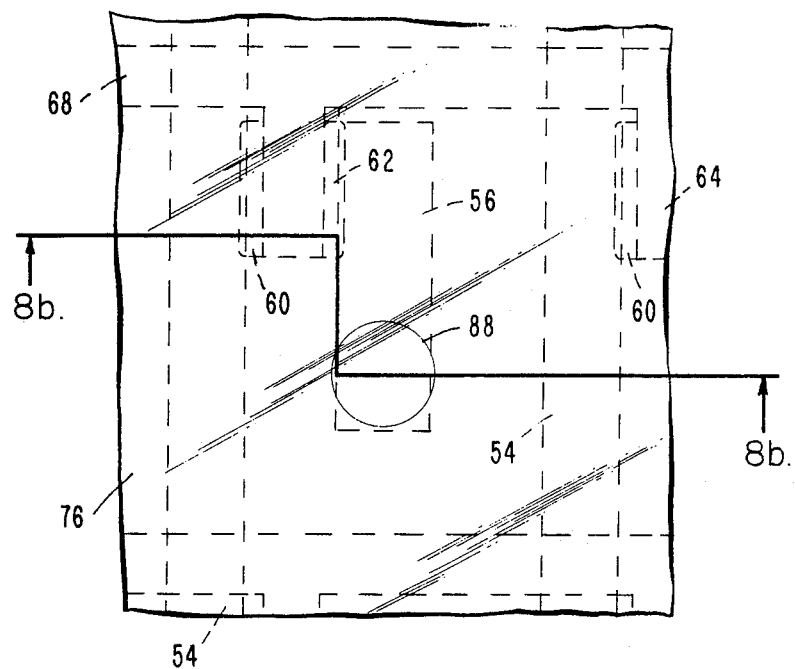
FIGS. 8a and 8b show the device after the formation of the light blocking layer which serves also as the common ground plate for the MOS capacitors of the panel array.
Figure 8B:
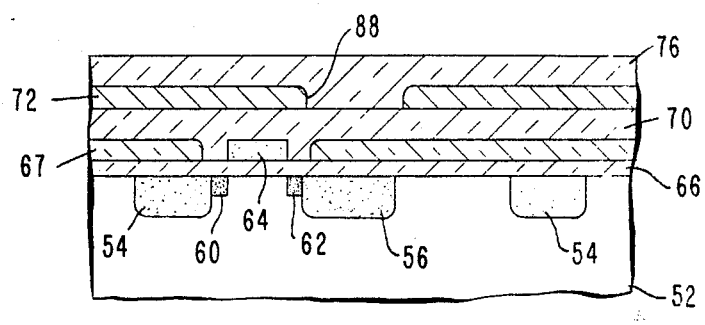
Figure 9A:
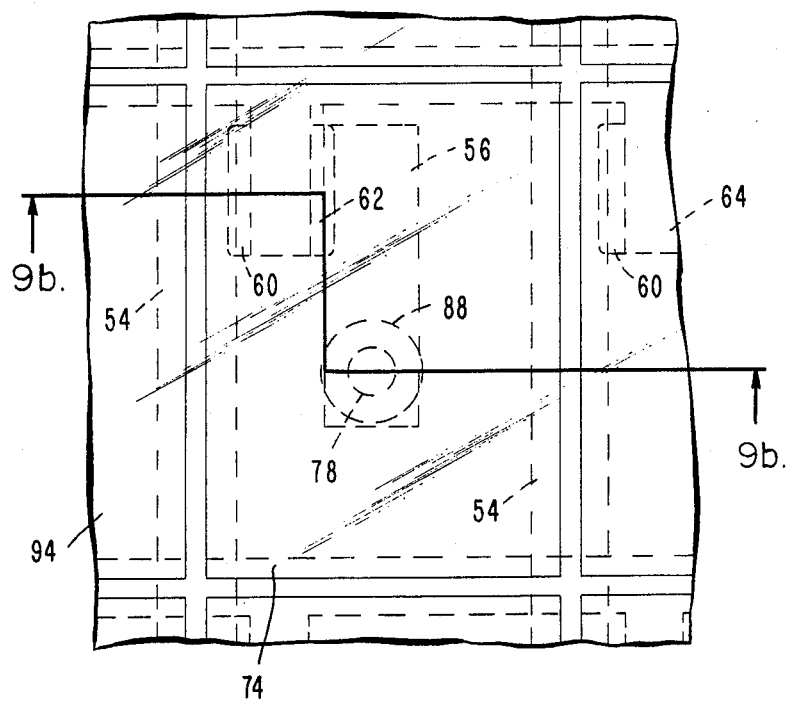
FIGS. 9a and 9b show in plan and cross-sectional views the essentially completed device of the invention after several fabrication steps, during which a capacitor structure completely overlying the FET has been formed and provision made for electrical contact between the FET sources and the light blocking layer which serves as the ground plate of the capacitor.
Figure 9B:
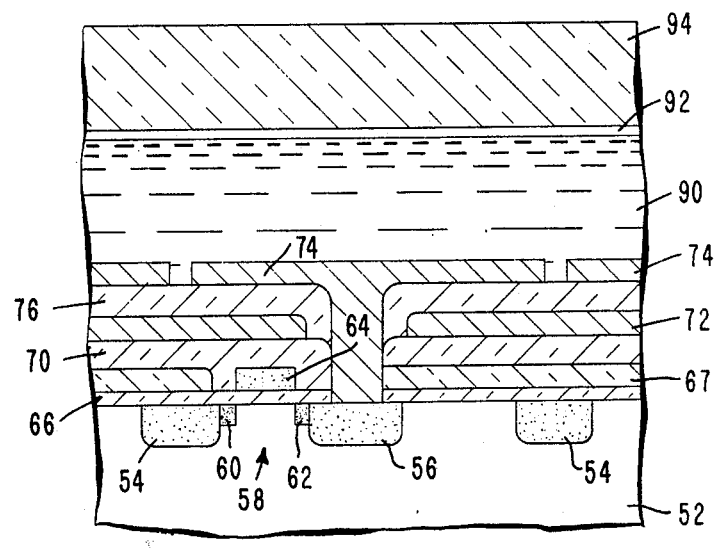

As can be seen in FIG. 9b, the display cell of the present invention includes a semiconductor backplate 52 having a plurality of highly doped regions 54, 56 of an opposite conductivity type at is upper edge. The substrate may be N-type silicon while P+ doped regions correspond, respectively, to the drain and the source of a switching FET 58. Ion implants 60, 62 are provided for the alignment of the diffusions 54, 56 with the polysilicon tab 64 which serves as the gate of the FET 58. A layer of oxide 66 is interposed between the gate and the substrate 52. As can be seen most clearly in FIGS. 7, 8 and 9, the drain electrode bus 54 comprises a highly doped region throughout the substrate 52 while the gate electrode bus 68 is a polycrystalline silicon strip throughout its length. Thus, the buses 54, 68 are insulated throughout by the oxide layer 66 and no need is thereby evidenced for the space-consuming "underpass" regions of the prior art, described above. Another layer 70 of oxide or other insulative material serves to encapsulate the gate electrode bus 68 including its associated tab 64. Overlying the layer 70 is a layer of metallization 72. The layer of metallization 72 serves as a light blocking layer, preventing the passage of harmful illumination to the underlying diffusions 54, 56. It is the provision of such a light blocking layer which allows the present invention to incorporate a drain electrode bus structure which comprises a diffusion throughout its entire length. The metallic light blocking layer 72, which covers substantially the entire area of the panel, not only protects the underlying diffusions but also acts as a common ground plane for the storage capacitors of the MOSFET circuitry.

The storage capacitor of the circuit is formed of the light blocking layer 72, the reflective metallic electrode 74 and the dielectric insulative oxide layer 76. Electrical connection is made between the source diffusion 56 and the reflective electrode 74 by means of a hole 78 etched through the various oxide layers. The "sandwich" structure of the storage capacitor plates, including the light blocking layer 72 and the reflective electrode 74, allows the stacking of the circuit's storage and switching functions over the same area of the cell. This geometry, coupled with the removal of inter-cell spacing requirements, imposed in the prior art by the underpassing of gate and drain electrode buses, discussed supra, maximizes the capacitor storage area per panel area ratio. A panel fabricated according to the concepts herein has been found to have nearly doubled the above-named ratio of the prior art concepts discussed herein. Analog voltage refresh time has been found to be a positive function of this ratio. Thus, a further benefit of the compact structure of the present invention is the increased refresh time achieved thereby, resulting in a decrease in visible flicker. Regarding the reduction in cell dimension over the prior art configurations referenced above, which are generally limited to a minimal cell area of approximately $10 \times 10$ mils, individual cells according to the invention have been fabricated having a circuit area of 2.3 micro-inch$^2$. This represents a greater than forty-fold area reduction. As in the prior art, a layer of liquid crystal material 90 overlies the cell, sandwiched between the transparent counter-electrode 92 of the front glass plate 94 and the reflective electrode 74. The arrangement of FIG. 9b appertains to a display panel of the type wherein cholesteric liquid crystal material 90 amenable to the dynamic scattering mode is employed. Alternatively, the cell may be slightly modified for utilization of an a.c. type twisted nematic material 90 by the inclusion of a dielectric layer overlying the reflective electrode 74.

The principal steps of a method by which a liquid crystal display panel incorporating features of the present invention may be fabricated will next be described with reference to FIGS. 5a and b through 9a and b. Each of the just-referenced figures includes both a top view, (a) and a sectional view (b) showing the sequential fabrication of the invention. In consonance with and for purposes of ready comparison to the above-referenced device of Dill et al, the process disclosed and the device (cell) produced will proceed from the starting (reference) point of an N-type silicon substrate 52. However, Applicant's concept is in no wise limited to the material characterizations disclosed but rather to relative conductivity types and dopant concentrations. A reversal in the absolute values thereof, along with a corresponding alteration in the polarity of operating voltages, will achieve equivalent operation and an equivalent device within the scope of Applicant's invention.

Figure 5A:
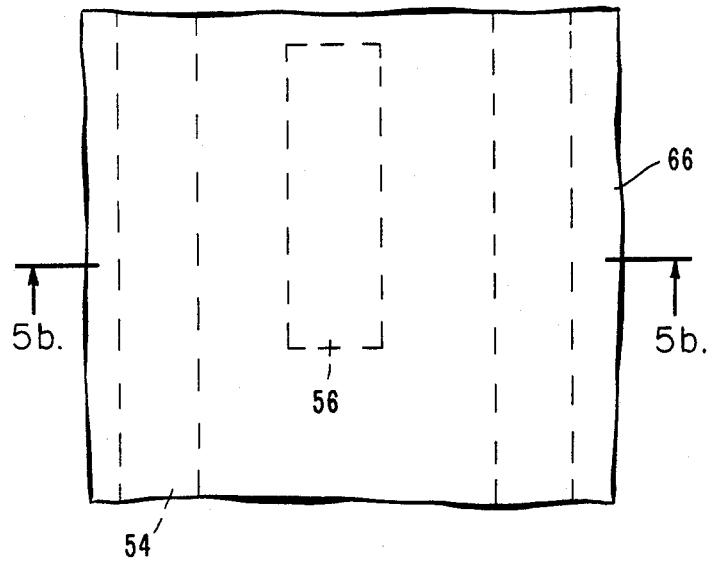
FIGS. 5a and 5b are the first of a series of plan and cross sections of the preferred embodiment of the present invention during successive stages of its fabrication, illustrating a semiconductor backplate in which diffusions have just been formed to create the FET sources and drain electrode buses.
Figure 5B:
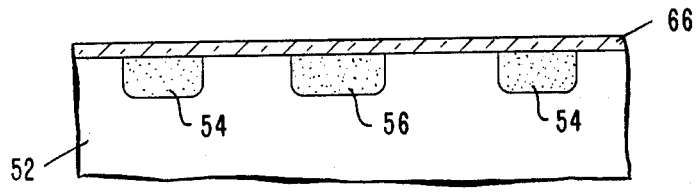

Referring now to FIGS. 5a and 5b, it may be seen that an N-type silicon substrate 52 is prepared having a plurality of parallel diffusions defining drain electrode buses 54 and FET sources 56 overlaid by an insulative layer of oxide 66. The P+ doped regions are formed within the substrate 52 by any of a number of standard doping methods including most commonly the boron diffusion or ion implantation technologies. In the event that ion implantion should be the preferred dopant method, an implantation dose of $2 \times 10^{13}$ atoms/cm$^2$ at 60 KEV is suitable.

Figure 6A:
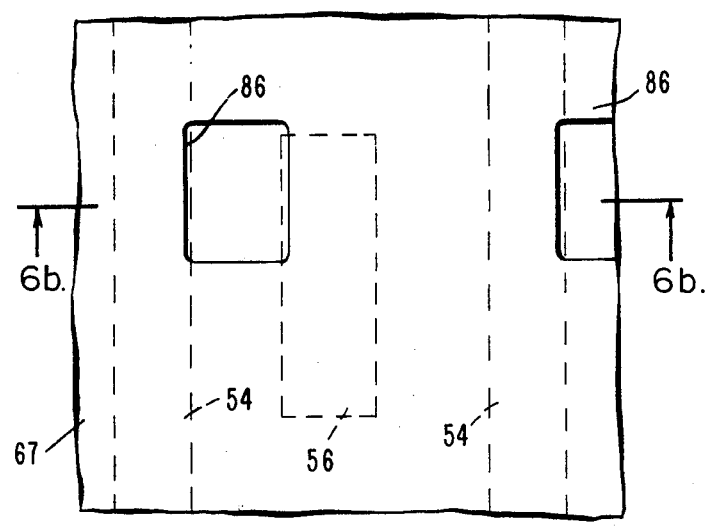
FIGS. 6a and 6b illustrate the next step in the manufacturing process, during which oxide is selectively grown or deposited to create channels for the gate electrode buses and associated gate tabs.
Figure 6B:
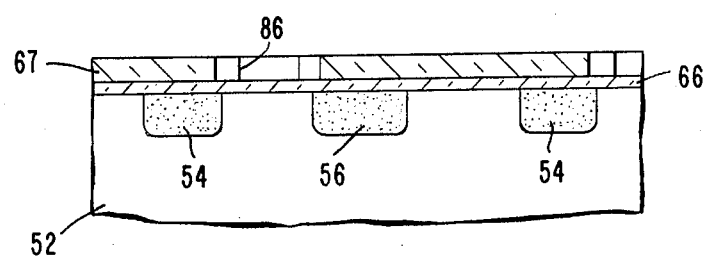

After removal of prior masking, an additional oxide layer 67 is deposited. The layer 67 is then masked and etched throughout its thickness to define the recessed regions 86 therein. The recessed regions 86 are provided for the polysilicon tabs 64 of the gate electrode buses 68 which function as the gates of the FETs. The tabs 64 are formed of the same layer of polysilicon which provides the gate electrode buses 68. Preferably, heavily boron-doped polysilicon (having a resistivity of approximately 50 ohm-centimeters) is deposited in a layer (typically 5,000 angstroms thick) on top of the structure illustrated in FIGS. 6a and 6b. After masking to define the desired gate electrode bus boundaries, the regions left exposed are then etched and, using the resultant tabs 64 of the gate electrode buses 68 as a mask, the FETs 58 structures of the array are brought into alignment for optimum operation by means of an ion implantation step (creating the P+ alignment regions 60, 62) to produce the structure of FIGS. 7a and 7b. (An appropriate implantation dose for creation of the regions 60, 62 has been found to be in the vicinity of $2 \times 10^{14}$ atoms/cm$^2$ at 80 KEV.)

Turning to FIGS. 8a, 8b, an oxide layer 70 is deposited over the device of FIGS. 7a and 7b, thereby encapsulating all polysilicon structures. The layer 70 is preferably 5,000 angstroms thick. Above this oxide is next formed the overlying capacitor structure. The common ground plate for all capacitors of the array, which also serves as the panel's light blocking layer, protecting the various doped regions, is deposited as the metal layer 72. Aluminum has been found to provide a suitable metal although the operability of the invention is not defined exclusively thereby.

The metal layer 72 is then masked and etched to create an opening 88 through which the associated overlying reflective electrode may be brought into contact with the FET source region 56. After the etching of the hole 88 in the metallic layer 72, a new oxide layer 76 is deposited thereover, creating an oxide plug within the hole 88.

Referring to FIGS. 9a and 9b, one can observe that the overlying capacitor structure has been completed. Prior to the application of the layer of metallization which serves as the capacitor plate/reflective electrode 74, the device is masked and etched to remove all oxide layers in the vicinity of the opening 78. A second layer of metallization 74 is then deposited upon the oxide layer 76, extending through the above-mentioned opening in the oxide layers and into contact with the source 56. Chromium is a suitable metal for the unitary capacitor plate, which is next masked with an electrode pattern to protect the portions of the metal layer 74 which are to serve as the reflective electrode from the selective etchant. Unlike the metal layer 72, the interface which exists between the metal layer 74 and liquid crystal material 90 makes aluminum an inappropriate choice for a dynamic scattering mode display.

The above steps essentially complete the construction of the elements which are located on the substrate 52. What remains is to place a film of liquid crystal material 90 on top of the assembly created by the preceding steps and a glass or other transparent plate 94, bearing a transparent electrode 92, on top of the liquid crystal material 90. By means not shown in the present disclosure but which are disclosed in the above-referenced Dill et al patent, the transparent electrode 92 is spaced from the backplate at a predetermined distance.

What is claimed is:
1. A liquid crystal display panel for providing a pictorial display comprising in combination:
    (a) a semiconductor backplate of a first conductivity type having a first surface and a second surface;
    (b) a plurality of substantially parallel, equally spaced conductive gate buses on the first surface of said semiconductor backplate;
    (c) a plurality of substantially parallel, equally spaced drain bus diffusions of a second conductivity type formed within said semiconductor backplate, said drain bus diffusions being orthogonal to and electrically insulated from said gate buses;
    (d) a field-effect transistor (FET) formed within each cell area defined by the intersection of an adjacent pair of gate buses with an adjacent pair of drain bus diffusions;
    (e) a coplanar array of closely spaced, reflective back electrodes, each of said back electrodes overlying one of said FETs and being in electrical connection with the source thereof;
    (f) a transparent electrode spaced from said coplanar array of reflective electrodes; and
    (g) liquid crystal material confined between said front and back electrodes, and defining an array of portions, each portion overlying a reflective back electrode;
    (h) the gate of each of said FETs in electrical connection with one of said conductive gate buses and the drain of each of said FETs comprising a portion of one of said drain bus diffusions so that there is provided a dense matrix of individually addressable reflective electrodes whereby there may be applied to each overlying portion of said liquid crystal material a video analog voltage.

2. A liquid crystal display panel as defined in claim 1 including a metallic layer overlying substantially all of said semiconductor backplate intermediate said plurality of conductive gate buses and said coplanar array of reflective electrodes and insulated therefrom, said metallic layer providing both a common ground plate for the plurality of storage capacitors formed thereby and a light blocking layer to shield the diffusions within said backplate.

3. A liquid crystal display panel as defined in claim 2 further characterized in that said metallic layer is aluminum.

4. In a panel for providing a pictorial display of the type wherein there is provided an array of reflective electrodes formed upon a semiconductor backplate for providing a spatial voltage array comprising a video frame to an overlying layer of liquid crystal material sandwiched between said array of reflective electrodes and a transparent electrode, each of said reflective electrodes forming one plate of a storage capacitor addressed by a corresponding array of switches formed upon said semiconductor backplate, the improvement comprising a metal layer intermediate said reflective electrode and switches and substantially parallel thereto, said metal serving as a common ground plate for the storage capacitors of the array, arranged so that each storage capacitor structure overlies its associated switch.

5. In a liquid crystal display panel of the type wherein there is provided an array of circuits, each circuit comprising switching means and associated voltage storage means, each of said circuits being addressed by a plurality of substantially parallel gate electrode buses and an orthogonally oriented plurality of substantially parallel drain electrode buses formed on a semiconductor substrate, the improvement comprising the fabrication of each of said drain electrode buses as a diffusion in said substrate and each of said gate electrode buses as an overlying conductor insulated therefrom so that each of said voltage storage means overlies its associated switching means to form a compact display panel.

6. A liquid crystal display panel as defined in claim 5 additionally characterized in that said voltage storage means includes a common metallic layer overlying substantially the entire surface of said substrate, whereby the diffusions comprising said drain electrode buses are shielded from illumination.

* * * * *